US010761353B2

(12) United States Patent
Chien

(10) Patent No.: US 10,761,353 B2
(45) Date of Patent: Sep. 1, 2020

(54) DISPLAY PANEL AND REPAIRING METHOD THEREOF

(71) Applicants: HKC Corporation Limited, Shenzhen (CN); Chongqing HKC Optoelectronics Technology Co., Ltd., Chongqing (CN)

(72) Inventor: Chung-Kuang Chien, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 0 days.

(21) Appl. No.: 16/342,200

(22) PCT Filed: May 5, 2017

(86) PCT No.: PCT/CN2017/083217
§ 371 (c)(1),
(2) Date: Apr. 15, 2019

(87) PCT Pub. No.: WO2018/086322
PCT Pub. Date: May 17, 2018

(65) Prior Publication Data
US 2019/0324303 A1 Oct. 24, 2019

(30) Foreign Application Priority Data
Nov. 9, 2016 (CN) .......................... 2016 1 0992864

(51) Int. Cl.
*G02F 1/1343* (2006.01)
*G02F 1/13* (2006.01)
*G02F 1/1335* (2006.01)

(52) U.S. Cl.
CPC ........ *G02F 1/1309* (2013.01); *G02F 1/13439* (2013.01); *G02F 1/133514* (2013.01)

(58) Field of Classification Search
CPC .................................................... G02F 1/1309
See application file for complete search history.

(56) References Cited

U.S. PATENT DOCUMENTS

2006/0214575 A1* 9/2006 Kajiyama ........... H01L 27/3244
313/506
2011/0278603 A1* 11/2011 Miyazawa ............ H01L 27/322
257/88

FOREIGN PATENT DOCUMENTS

CN     1779526 A     5/2006
CN   101114076 A     1/2008
(Continued)

OTHER PUBLICATIONS

Lina Zou, the International Searching Authority written comments, Jul. 2017, CN.
Lina Zou, the International Search Report, dated Jul. 2017, CN.

*Primary Examiner* — James A Dudek

(57) ABSTRACT

This application discloses a display panel and a repairing method thereof. The display panel includes a color filter substrate, the color filter substrate including a substrate, color filter layer, an Indium Tin Oxide layer, and conducting components. The color filter layer is disposed on the substrate. The Indium Tin Oxide layer is disposed on the color filter layer. Repairing point is disposed on a same position of the color filter layer and the Indium Tin Oxide layer. The conducting components are filled in the repairing point to be electrically connected to the Indium Tin Oxide layer on both sides of the repairing point, to form complete the Indium Tin Oxide layer. The conducting components have a same color as color of the color filter layer on both sides of the repairing point.

17 Claims, 8 Drawing Sheets

(56) References Cited

FOREIGN PATENT DOCUMENTS

| | | |
|---|---|---|
| JP | 2004053971 A | 2/2004 |
| JP | 2008281696 A | 11/2008 |
| JP | 2012108291 A | 6/2012 |
| JP | 2012118444 A | 6/2012 |
| KR | 101076430 B1 | 10/2011 |

* cited by examiner

DISPLAY PANEL AND REPAIRING METHOD THEREOF

This application claims priority to Chinese Patent Application No. CN2016109928645, filed with the Chinese Patent Office on Nov. 9, 2016 and entitled "DISPLAY PANEL AND REPAIRING METHOD THEREOF", which is incorporated herein by reference in its entirety.

TECHNICAL FIELD

This application relates to the field of display technologies, and in particular, to a display panel and a repairing method thereof.

BACKGROUND

The description herein provides only background information related to this application, but does not necessarily constitute the existing technology.

Liquid crystal display apparatuses have numerous advantages, such as a thin body, power saving, no radiation, etc, and are widely used. Most liquid crystal display apparatuses in the market are backlight type liquid crystal display apparatuses, each including a display panel and a backlight module. Working principle of the display panel is that liquid crystals are disposed between two parallel glass substrates, and a driving voltage is applied to two glass substrates to control rotation direction of the liquid crystals, to refract light rays of the backlight module to generate a picture.

Thin film transistor-liquid crystal display (TFT-LCD) apparatuses currently maintain a leading status in the display field because of low power consumption, excellent picture quality, high production yield, and other properties. Similarly, the TFT-LCD apparatus includes a display panel and a backlight module. The liquid crystal panel includes a color filter substrate (CF substrate) and a thin film transistor substrate (TFT substrate), and transparent electrodes on relative inner sides of the above substrates. A layer of liquid crystals (LC) is disposed between two substrates. The display panel changes a polarized state of light by controlling direction of the LCs through an electric field, for penetration and obstruction of a light path via a polarized plate to display.

In the process of manufacturing a color filter substrate, a color filter layer is formed by repeated photoresist coating, exposure and developing, and then a CF (color filter) substrate finished product is formed by using technologies such as Indium Tin Oxides (ITO), photo spacer (PS), etc. Foreign matter in the PS is generally removed by a laser, as shown in FIG. 1. When the laser is used to remove the foreign matter, Indium Tin Oxide layer and a color filter layer around the foreign matter, will also be removed. As shown in FIG. 2, to realize filtering, the color filter layer is repaired with a color filter layer of a same color, so that the color filter layer can filter the light source. As shown in FIG. 3, however, in the process of removing the foreign matter, the Indium Tin Oxide layer around the foreign matter is also removed, and exists abnormal potential and adverse phenomena. Specific poor phenomena are presented as follows: the repairing point around the foreign matter tend to be white at the black-gray scale, the repairing point around the foreign matter tend to be black at the middle gray scale, and the repairing point around the foreign matter tend to be black at the white-gray scale.

SUMMARY

This application provides a display panel and a repairing method thereof, and this application electrically connected to the Indium Tin Oxide layer on both sides of the repairing point.

In addition, the application provides a liquid crystal display apparatus, and the liquid crystal display apparatus is made of the display panel.

In addition, the application provides a repairing method for a display panel, realizing electrical connection with the Indium Tin Oxide layer.

The purpose of the application is achieved through the following technology:

According to one aspect of the application, the application discloses a display panel include a color filter substrate, and the color filter substrate includes a substrate, a color filter layer, an Indium Tin Oxide layer and a conducting components, the color filter layer is disposed on the substrate, the Indium Tin Oxide layer is disposed on the color filter layer, a repairing point is disposed on a same position of the color filter layer and the Indium Tin Oxide layer, and the conducting components is filled in the repairing point, electrically connected to the Indium Tin Oxide layer on both sides of the repairing point, the conducting component includes a conducting color filter layer directly filled in the repairing point to be electrically connected to the Indium Tin Oxide layer on both sides of the repairing point, the conducting color filter layer has a same color as color of the color filter layer on both sides of the repairing point; and a height of the conducting color filter layer is greater than a height of the repairing point, and the height of the conducting color filter layer is greater than a height of the Indium Tin Oxide layer on both sides of the repairing point.

The application discloses a display panel include a color filter substrate and the color filter substrate includes a substrate, a color filter layer, an Indium Tin Oxide layer and conducting components, the color filter layer is disposed on the substrate, the Indium Tin Oxide layer is disposed on the color filter layer, a repairing point is disposed on a same position of the color filter layer and the Indium Tin Oxide layer, and the conducting components are filled in the repairing point, electrically connected to the Indium Tin Oxide layer on both sides of the repairing point.

Optionally, the conducting components have a same color as a color of the color filter layer on both sides of the repairing point.

Optionally, the conducting component includes a conducting color filter layer directly filled in the repairing point to be electrically connected to the Indium Tin Oxide layer on both sides of the repairing point, and the conducting color filter layer has a same color as color of the color filter layer on both sides of the repairing point.

Optionally, a shading layer is also disposed on the substrate, and the shading layer is disposed between two adjacent color filter layers.

Optionally, a height of the conducting color filter layer is greater than a height of the repairing point, and the height of the conducting color filter layer is greater than a height of the Indium Tin Oxide layer on both sides of the repairing point.

Optionally, the conducting component includes an additional filter and a transparent conducting adhesive; the additional filter is filled in the repairing point, and the additional filter has a same color as color of the color filter layer on both sides of the repairing point; the transparent conducting adhesive is disposed on a surface of the additional filter, and the transparent conducting adhesive is used to be electrically connected to the Indium Tin Oxide layer.

Optionally, the transparent conducting adhesive is equal to the thickness of the Indium Tin Oxide layer.

Optionally, the conducting component includes a transparent conducting adhesive filled in the repairing point to be electrically connected to the Indium Tin Oxide layer.

Optionally, the transparent conducting adhesive and the Indium Tin Oxide layer on both sides of the repairing point are disposed at an identical height.

Optionally, the conducting color filter layer and the Indium Tin Oxide layer on both sides of the repairing point are disposed at an identical height.

Optionally, the additional filter and the color filter layer on both sides of the repairing point are disposed at an identical height.

According to still another aspect of the application, the application also discloses a repairing method for a display panel, including the following steps:

forming a repairing point by a laser to remove a foreign matter, an Indium Tin Oxide layer, and a color filter layer around the foreign matter of a color filter substrate on the display panel; and filling the repairing point with the conducting components, the conducting components is the same color as the color filter layer on both sides of the repairing point, and the conducting components electrically connected to the Indium Tin Oxide layer on both sides of the repairing point.

Optionally, a shading layer is also disposed on the substrate, and the shading layer is disposed between two adjacent color filter layers.

Optionally, a conducting component includes a conducting color filter layer directly filled in the repairing point to be electrically connected to the Indium Tin Oxide layer on both sides of the repairing point, and the conducting color filter layer has a same color as color of the color filter layer on both sides of the repairing point.

Optionally, the conducting color filter layer and the Indium Tin Oxide layer on both sides of the repairing point are disposed at an identical height.

Optionally, a conducting component includes a conducting color filter layer directly filled in the repairing point to be electrically connected to the Indium Tin Oxide layer on both sides of the repairing point, and the conducting color filter layer has a same color as color of the color filter layer on both sides of the repairing point.

Optionally, the conducting component includes an additional filter and a transparent conducting adhesive; the additional filter is filled in the repairing point, and the additional filter has a same color as color of the color filter layer on both sides of the repairing point; the transparent conducting adhesive is disposed on a surface of the additional filter, and the transparent conducting adhesive is used to be electrically connected to the Indium Tin Oxide layer.

Optionally, the conducting component includes a transparent conducting adhesive filled in the repairing point to be electrically connected to the Indium Tin Oxide layer.

Optionally, the additional filter and the color filter layer on both sides of the repairing point are disposed at an identical height.

In this application, a conducting component with a conducting function is filled in the repairing point, The conducting component is electrically connected to the Indium Tin Oxide layer on the both sides of the repairing point, so that the Indium Tin Oxide layer realizes electrical connection around the repairing point and avoids forming abnormal potential after removal of foreign matter. Then, when the liquid crystal display apparatus including the display panel is used, poor point alignment may not occur, so that a display of the liquid crystal display apparatus is optional.

BRIEF DESCRIPTION OF DRAWINGS

The drawings included are used for providing further understanding of embodiments of the application, constitute part of the description, are used for illustrating implementation manners of the application, and interpreting principles of the application together with text description. Apparently, the drawings in the following description are merely some embodiments of the application, and for those of ordinary skill in the art, other drawings can also be obtained according to the drawings without contributing creative labor. In the drawings.

DETAILED DESCRIPTION

Specific structure and function details disclosed herein are only representative and are used for the purpose of describing exemplary embodiments of the application. However, the application may be specifically achieved in many alternative forms and shall not be interpreted to be only limited to the embodiments described herein.

It should be understood in the description of the application that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the application and the simplification of the description rather than to indicate or imply that the indicated apparatus or element must have a specific direction or constructed and operated in a specific direction, and therefore, shall not be understood as a limitation to the application. In addition, the terms such as "first" and "second" are only used for the purpose of description, rather than being understood to indicate or imply relative importance or hint the number of indicated technical features. Thus, the feature limited by "first" and "second" can explicitly or implicitly comprise one or more features. In the description of the application, the meaning of "a plurality of" is two or more unless otherwise specified. In addition, the term "comprise" and any variant are intended to cover non-exclusive inclusion.

It should be noted in the description of the application that, unless otherwise specifically regulated and defined, terms such as "installation", "bonded" and "bonding" shall be understood in broad sense, and for example, may refer to fixed bonding or detachable bonding or integral bonding, may refer to mechanical bonding or electrical bonding, and may refer to direct bonding or indirect bonding through an intermediate medium or inner communication of two elements. For those of ordinary skill in the art, the meanings of the above terms in the application may be understood according to specific conditions.

The terms used herein are intended to merely describe specific embodiments, not to limit the exemplary embodiments. Unless otherwise noted clearly in the context, singular forms "one" and "single" used herein are also intended to comprise plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

The application will be described in detail in combination with the drawings and optional embodiments as follow.

Figure 1:
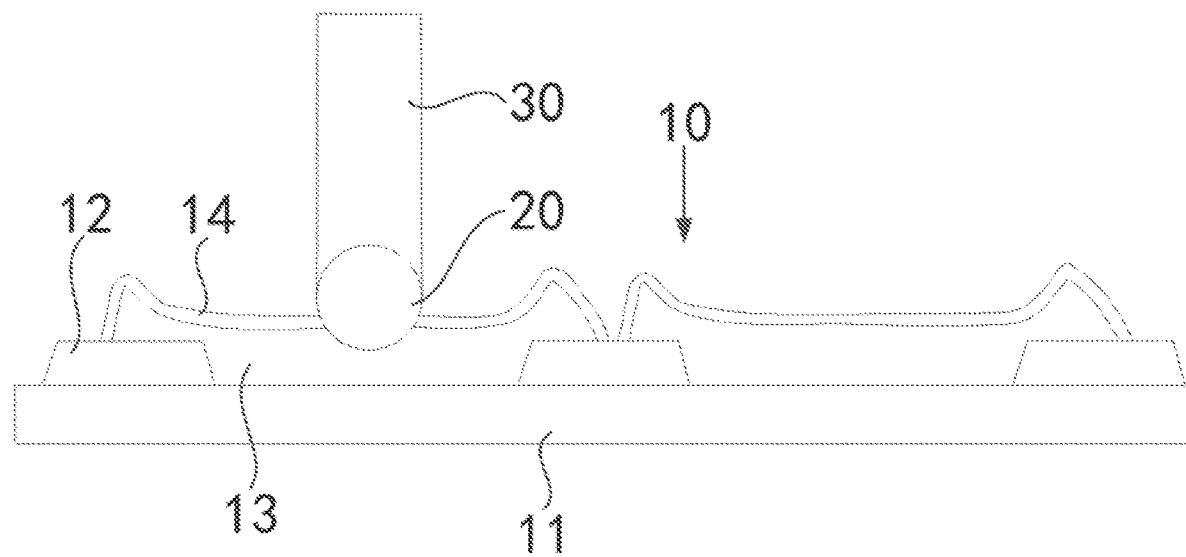
FIG. 1 is a schematic diagram for removing foreign matter on a color filter substrate in a display panel by laser.
Figure 2:
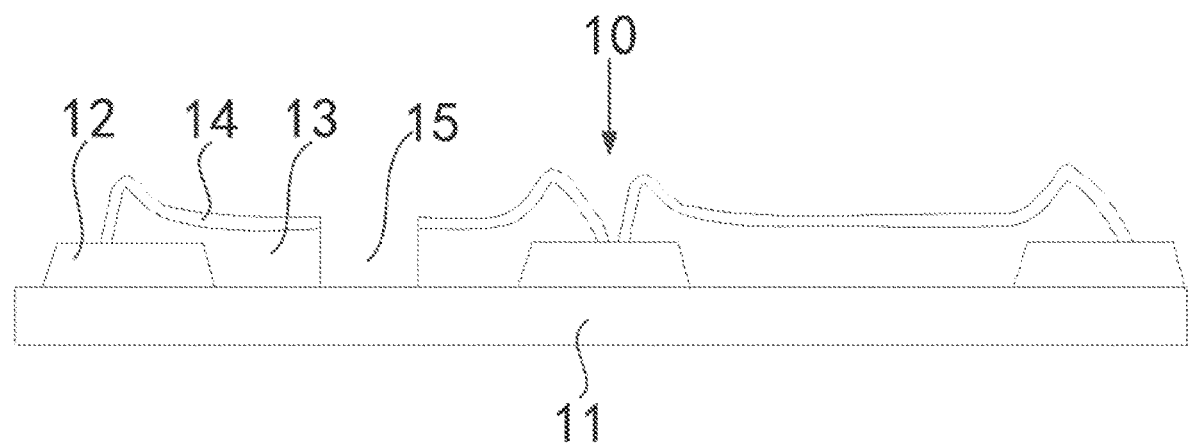
FIG. 2 is a schematic diagram after removing foreign matter on a color filter substrate in a display panel by laser.
Figure 3:
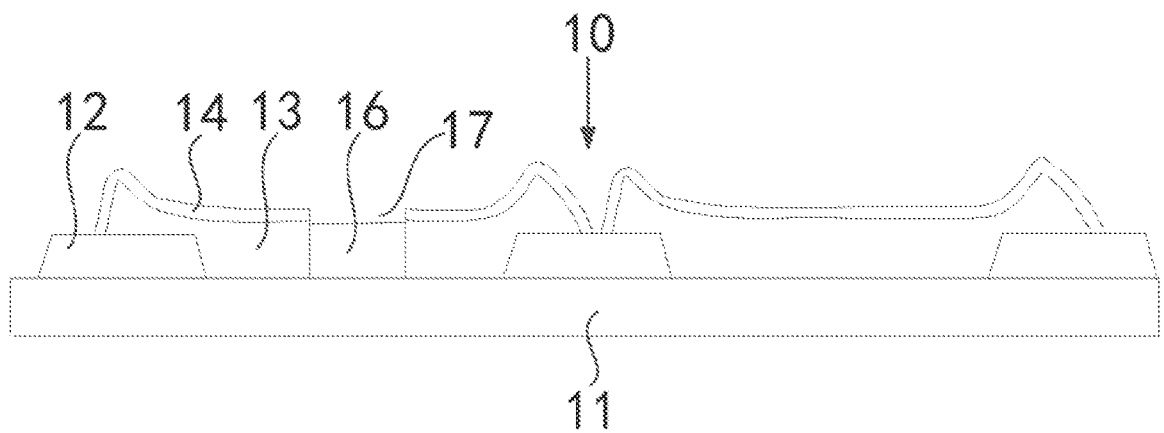
FIG. 3 is a schematic diagram for repairing a display panel.

As shown in FIG. 1 to FIG. 3, the color filter substrate 10 includes a substrate 11, a shading layer 12 and a color filter layer 13 disposed on the substrate 11, and Indium Tin Oxide layer 14 disposed on the color filter layer 13. When the laser 30 is used to remove the foreign matter 20, the Indium Tin Oxide layer and the color filter layer, around the foreign matter, will also be removed, to form a repairing point 15, so that the Indium Tin Oxide layer 14 and the color filter layer 13 are destroyed. To realize filtering, one practice is to remove the Indium Tin Oxide layer and the color filter layer and supplement the color filter layer 16 having a same color, i.e, the color filter layer 16 is supplemented around the repairing point 15. The color filter layer 16 is identical material with the color filter layer on both sides of the repairing point. However, a space 17 is still reserved on the Indium Tin Oxide layer. The Indium Tin Oxide layer does not realize electrical connection, causing abnormal potential where the Indium Tin Oxide layer is removed.

The display panel and the repairing method thereof in the embodiment of the application are described with reference to FIG. 4 to FIG. 13 and in combination with FIG. 1 and FIG. 2 to solve the above technical problem.

Figure 4:
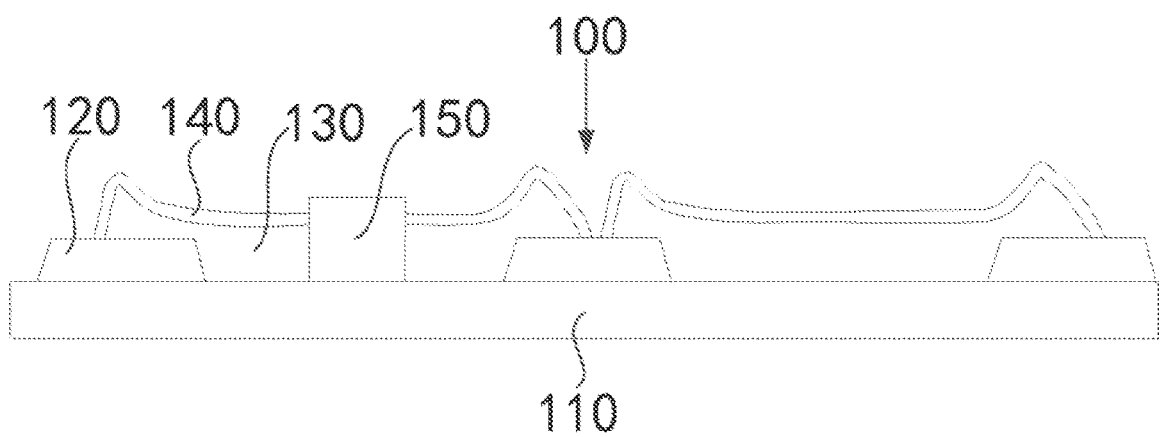
FIG. 4 is a schematic diagram of a portion of a color filter substrate in a display panel in an embodiment of the application.
Figure 7:
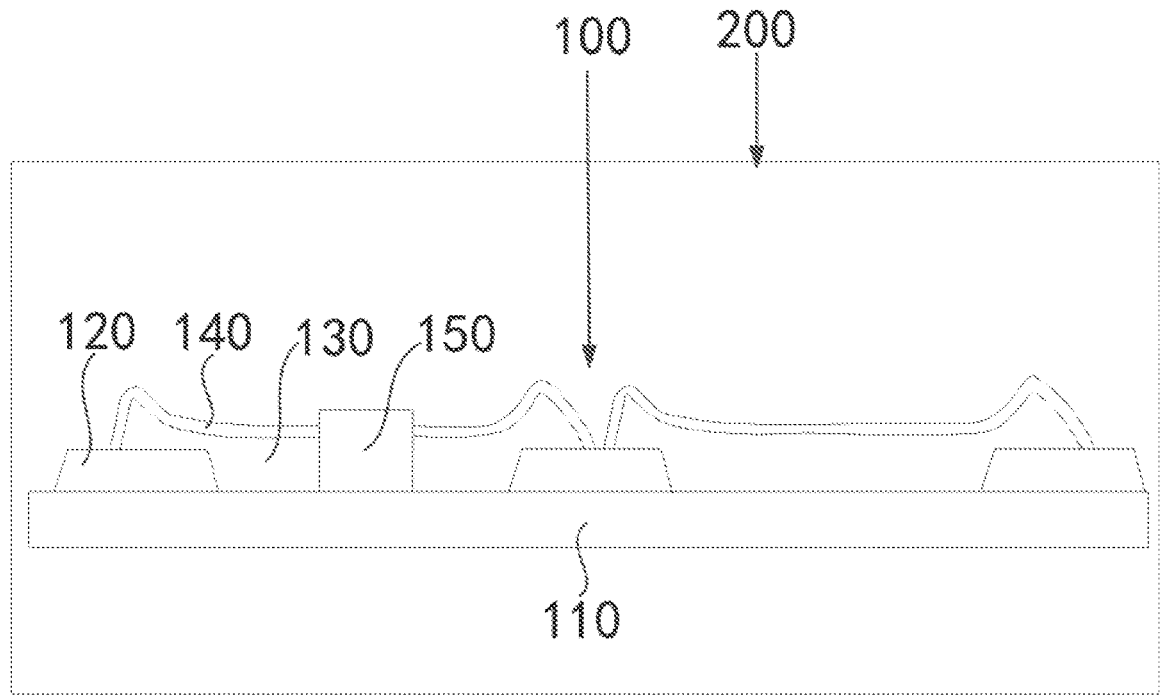
FIG. 7 is a schematic diagram of a display panel in an embodiment of the application.

In one or more embodiments, discloses a display panel as shown in FIG. 4 and FIG. 7. FIG. 4 is a structural schematic diagram of a portion of a color filter substrate in a display panel in one or more embodiments of the application. In one or more embodiments shown in FIG. 7 discloses a structure of a display panel. The color filter substrate 100 of the display panel 200 includes a substrate 110, a shading layer 120, a color filter layer 130, an Indium Tin Oxide layer 140 and a conducting component. The shading layer 120 and the color filter layer 130 are disposed on the substrate 110. The Indium Tin Oxide layer 140 is disposed on the color filter layer 130, and repairing point is disposed on the color filter layer 130 and the Indium Tin Oxide layer 140. For the repairing point, see the repairing point 15 in FIG. 2. The repairing point in the present embodiment is identical with those in FIG. 2, and can also be obtained by the method in FIG. 1. Namely, the foreign matter is easy to form on the color filter substrate in manufacturing the display panel of the present embodiment. To remove the foreign matter, the laser needs to be used. When the laser is used to remove the foreign matter, the Indium Tin Oxide layer and the color filter layer, around the foreign matter, will also be removed, to form the repairing point.

In one or more embodiments, the conducting components are filled in the repairing point to be electrically connected to the Indium Tin Oxide layer on both sides of the repairing point. The Indium Tin Oxide layer forms electrical connection. Thus, a conducting component with a conducting function is filled in the repairing point in the present embodiment. The conducting component is filled in the repairing point in the present embodiment to be electrically connected to the Indium Tin Oxide layer, so that the Indium Tin Oxide layer realizes electrical connection at the repairing point and avoids forming abnormal potential after removal of foreign matter. Then, when the liquid crystal display apparatus including the display panel is used, poor point alignment may not occur, so that a display of the liquid crystal display apparatus is better.

In one or more embodiments, the conducting component has a same color as color of the color filter layer on both sides of the repairing point. The conducting component in the present embodiment is filled in the repairing point to not only realize filtering through connection with the color filter layer, but also electrically connected to the Indium Tin Oxide layer, so that the Indium Tin Oxide layer realizes electrical connection at the repairing point and avoids forming abnormal potential after removal of foreign matter. Then, when the liquid crystal display apparatus including the color filter substrate is used, poor point alignment may not occur, so that a display of the liquid crystal display apparatus is better.

The conducting component includes a conducting color filter layer 150, the conducting color filter layer 150 is directly is filled in the repairing point to be electrically connected to the Indium Tin Oxide layer on both sides of the repairing point, and the conducting color filter layer 150 has the same color as color of the color filter layer on both sides of the repairing point. This is an optional manner for realizing electrical connection with the Indium Tin Oxide layer and realizing filtering in the application. A conducting color filter layer is used to realize electrical connection with the Indium Tin Oxide layer and realize filtering, thereby saving a production processes and saving production time.

Figure 5:
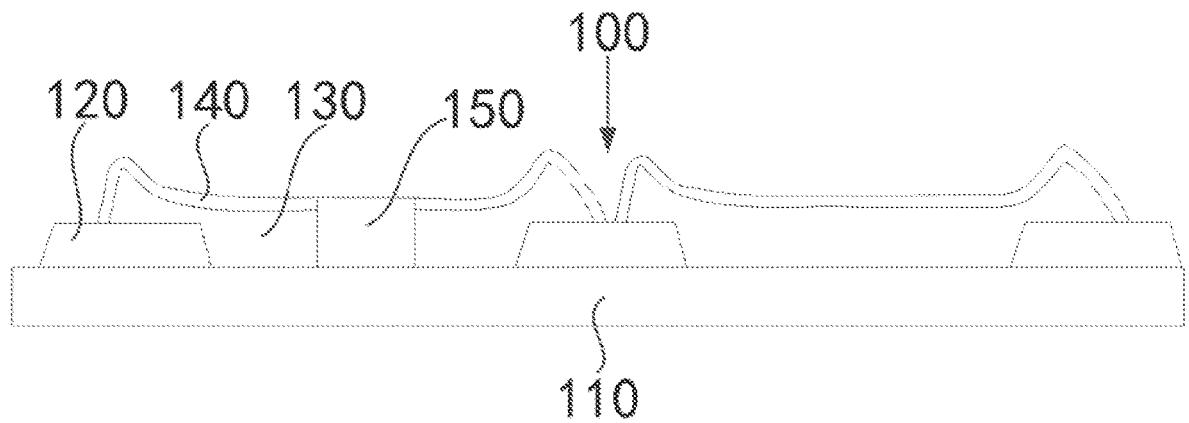
FIG. 5 is a schematic diagram of a portion of a color filter substrate in a display panel in an embodiment of the application.
Figure 8:
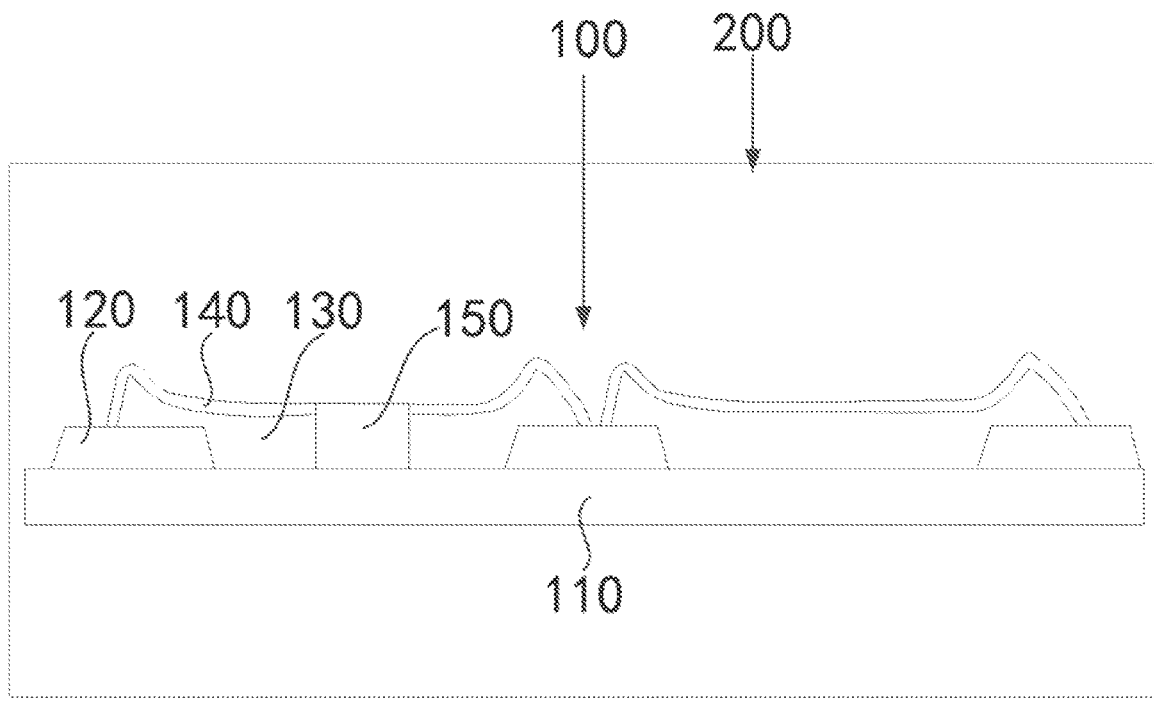
FIG. 8 is a schematic diagram of a display panel in an embodiment of the application.

Specifically, a height of the conducting color filter layer 150 is greater than a height of the repairing point, and the height of the conducting color filter layer is greater than a height of the Indium Tin Oxide layer on both sides of the repairing point. Because the height of the conducting color filter layer is greater than the height of the repairing point, when the conducting color filter layer is filled in the repairing point, the conducting color filter layer is fully connected to the Indium Tin Oxide layer on both sides of the repairing point to ensure a better electrical connection between the conducting color filter layer and the Indium Tin Oxide layer. However, for those of ordinary skill, it should be noted that the conducting color filter layer and the repairing point are disposed at an identical height in the present embodiment 1, as shown in FIG. 5 and FIG. 8.

In the present embodiment, a problem of dark spot at the repairing point is solved through filling the conducting color filter layer in the repairing point.

Figure 6:
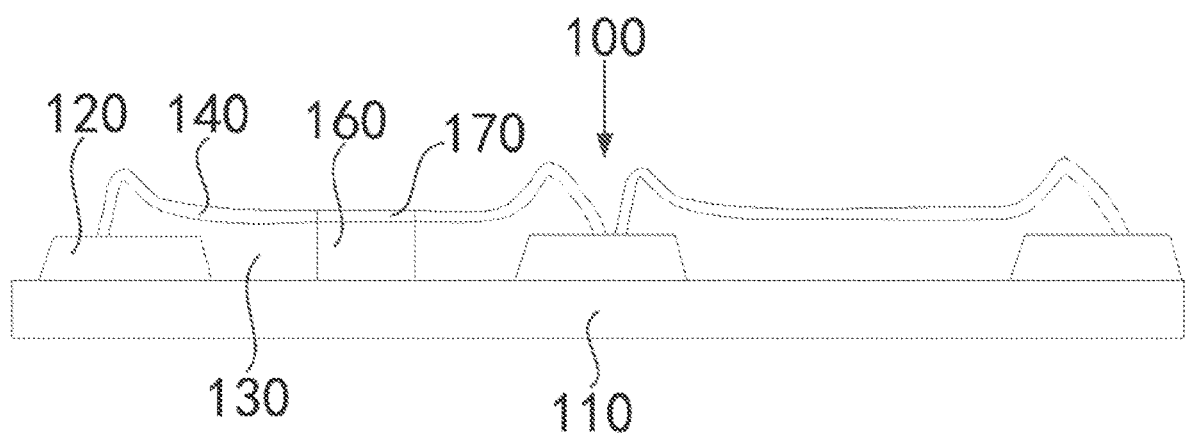
FIG. 6 is a schematic diagram of a portion of a color filter substrate in a display panel in an embodiment of the application.
Figure 9:
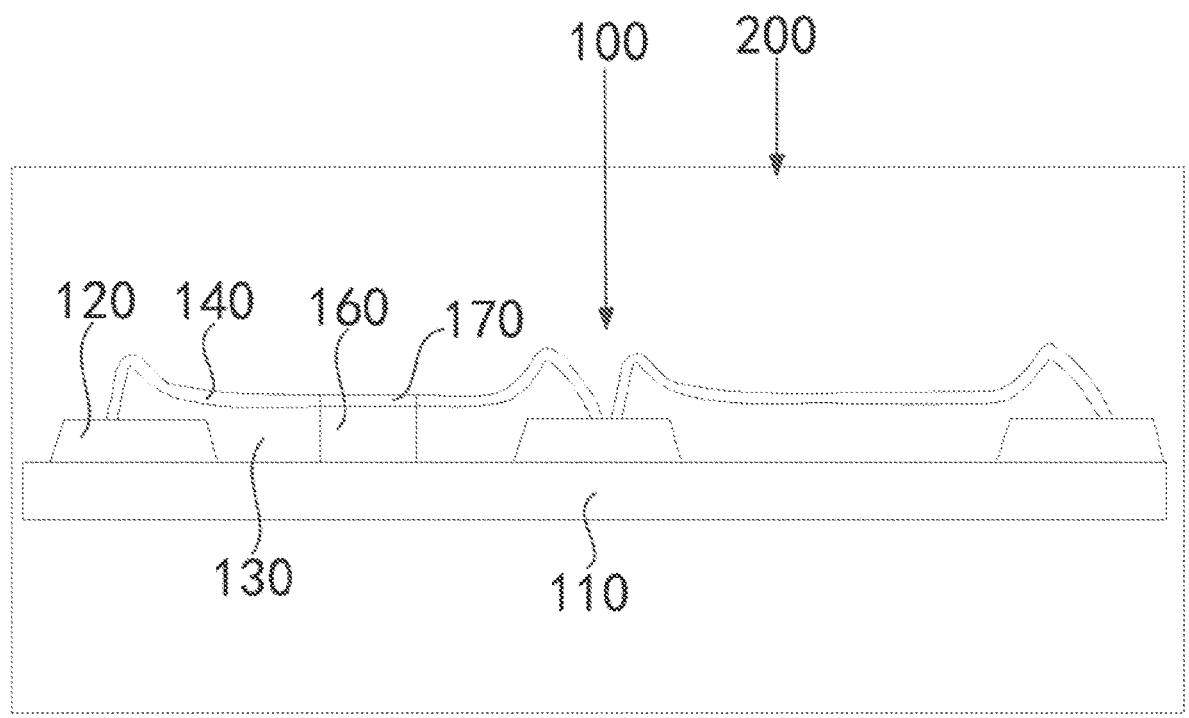
FIG. 9 is a schematic diagram of a display panel in an embodiment of the application.

In one or more embodiments, as shown in FIG. 6 and FIG. 9, FIG. 6 is a schematic diagram of a portion of a color filter substrate in a display panel in an embodiment of the application, and FIG. 9 is a structural schematic diagram of a display panel of an embodiment of the application. The color filter substrate 100 of the display panel 200 in the present embodiment includes a substrate 110, a shading layer 120, a color filter layer 130, an Indium Tin Oxide layer 140 and a conducting component. The shading layer 120 and the color filter layer 130 are disposed on the substrate 110. The Indium Tin Oxide layer 140 is disposed on the color filter layer 130, and repairing point is disposed on the color filter layer 130 and the Indium Tin Oxide layer 140. For the repairing point, see the repairing point 15 in FIG. 2. The repairing point in the present embodiment is identical with those in FIG. 2, and can also be obtained by the method in FIG. 1. Namely, the foreign matter is easy to form on the color filter substrate 100 in manufacturing the display panel 200 of the present embodiment. To remove the foreign matter, the laser needs to be used. When the laser is used to remove the foreign matter, the Indium Tin Oxide layer and the color filter layer, around the foreign matter, will also be removed, to form the repairing point.

In one or more embodiments, the conducting component is filled in the repairing point to be electrically connected to the Indium Tin Oxide layer on both sides of the repairing point. The Indium Tin Oxide layer forms electrical connection. Thus, a conducting component with a conducting function is filled at the repairing point in the present embodiment. The conducting component is filled in the repairing point in the present embodiment to be electrically connected to the Indium Tin Oxide layer, so that the Indium Tin Oxide layer realizes electrical connection at the repairing point and avoids forming abnormal potential after removal of foreign matter. Then, when the liquid crystal display apparatus including the display panel is used, poor point alignment may not occur, so that a display of the liquid crystal display apparatus is better.

Specifically, the conducting component includes an additional filter 160 and a transparent conducting adhesive 170. Namely, the conducting component in the present embodiment is made of the additional filter 160 and the transparent conducting adhesive 170 without using the conducting color filter layer in the embodiment. Specifically, in combination with FIG. 1 and FIG. 2, the additional filter 160 is filled in the repairing point, the additional filter 160 has a same color as color of the color filter layer on both sides of the repairing point, and further, the additional filter 160 is made of the same material as that of the color filter layer on both sides of the repairing point. Thus, the present embodiment not only realizes filtering through connection with the color filter layer, but also electrically communicates with the Indium Tin Oxide layer, so that the Indium Tin Oxide layer realizes electrical connection at the repairing point and avoids forming abnormal potential after removal of foreign matter. Then, when the liquid crystal display apparatus including the color filter substrate is used, poor point alignment may not occur, so that a display of the liquid crystal display apparatus is better. The transparent conducting adhesive 170 is disposed on a surface of the additional filter 160, and the transparent conducting adhesive 170 is used for electrically communicating with the Indium Tin Oxide layer. This is a specific manner for realizing electrical connection with the Indium Tin Oxide layer and realizing filtering in the present embodiment. The transparent conducting adhesive 170 is made of material similar to that of the Indium Tin Oxide layer, and has better connection strength and electrical conductivity with the Indium Tin Oxide layer on both sides of the repairing point. However, for those of ordinary skill, it should be noted that in realizing electrical connection with the Indium Tin Oxide layer in the present embodiment, the transparent conducting adhesive is directly is filled in the repairing point, i.e., only the transparent conducting adhesive is filled in the repairing point. The transparent conducting adhesive is made of material similar to that of the Indium Tin Oxide layer, and has better connection strength and electrical conductivity with the Indium Tin Oxide layer on both sides of the repairing point.

Specifically, the additional filter and the color filter layer on both sides of the repairing point are disposed at an identical height, the Indium Tin Oxide layer on the additional filter is better connected with the Indium Tin Oxide layer on both sides of the repair point, So as to make the both sides of the Indium Tin Oxide layer is stable, good repair effect, at the same time, there was a match to avoid repair point light adverse problems arent conductive adhesive.

Figure 10:
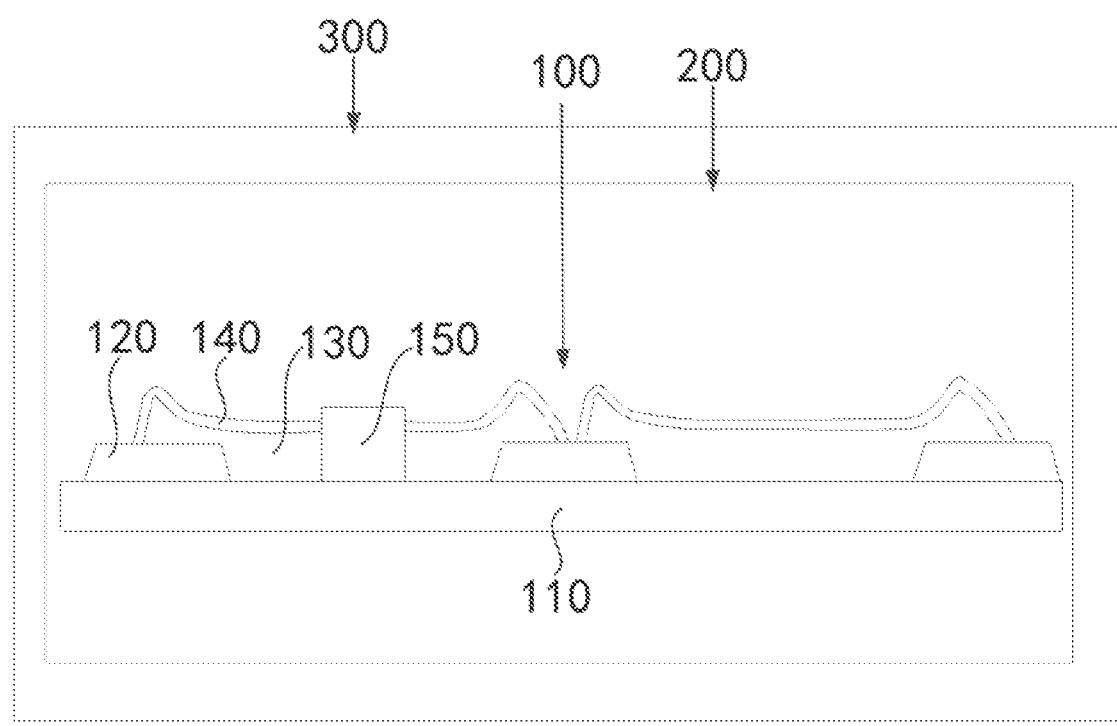
FIG. 10 is a schematic diagram of a liquid crystal display apparatus in an embodiment of the application.
Figure 11:
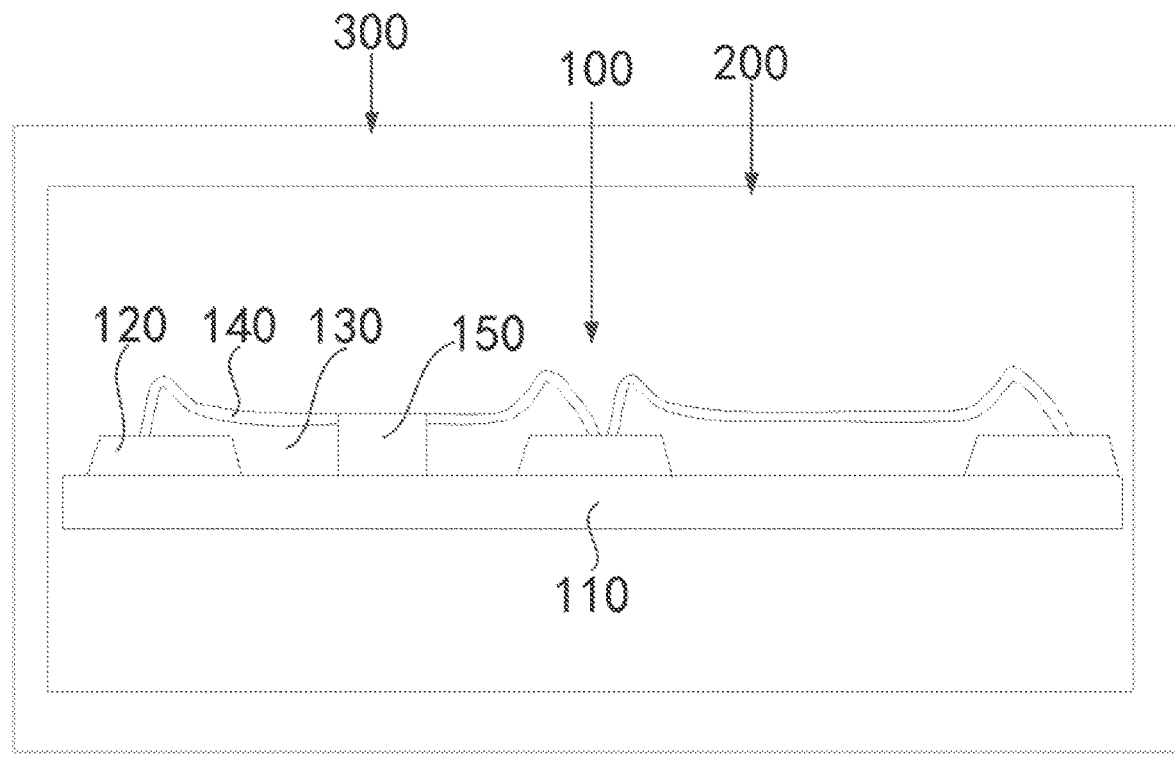
FIG. 11 is a schematic diagram of a liquid crystal display apparatus in an embodiment of the application.
Figure 12:
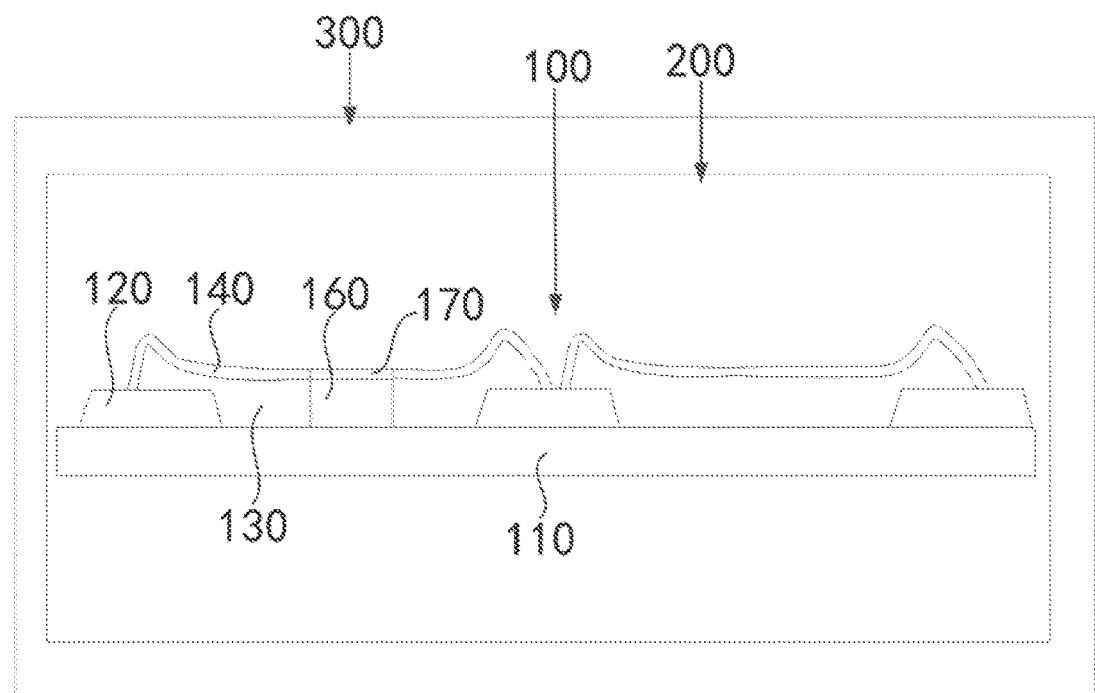
FIG. 12 is a schematic diagram of a liquid crystal display apparatus in an embodiment of the application.

In one or more embodiments, discloses a liquid crystal display apparatus. As shown in FIG. 10 to FIG. 12, the liquid crystal display apparatus 300 in the present embodiment includes a display panel 200 including a color filter substrate 100. In combination with FIG. 1, FIG. 2 and FIG. 4 to FIG. 9, in the present embodiment, the color filter substrate 100 includes a substrate 110, a shading layer 120, a color filter layer 130, an Indium Tin Oxide layer 140 and a conducting component. The shading layer 120 and the color filter layer 130 are disposed on the substrate 110. The Indium Tin Oxide layer 140 is disposed on the color filter layer 130, and repairing point is disposed on the color filter layer 130 and the Indium Tin Oxide layer 140. For the repairing point, see the repairing point 15 in FIG. 2. The repairing point in the present embodiment is identical with those in FIG. 2, and can also be obtained by the method in FIG. 1. Namely, the foreign matter is easy to form on the color filter substrate in manufacturing the display panel of the present embodiment. To remove the foreign matter, the laser needs to be used. When the laser is used to remove the foreign matter, the Indium Tin Oxide layer and the color filter layer, around the foreign matter, will also be removed, to form the repairing point.

In one or more embodiments, the conducting component is filled in the repairing point to be electrically connected to the Indium Tin Oxide layer on both sides of the repairing point. The Indium Tin Oxide layer forms electrical connection. Thus, a conducting component with a conducting function is filled in the repairing point in the present embodiment. The conducting component is filled in the repairing point in the present embodiment to be electrically connected to the Indium Tin Oxide layer, so that the Indium Tin Oxide layer realizes electrical connection at the repairing point and avoids forming abnormal potential after removal of foreign matter. Then, when the liquid crystal display apparatus including the display panel is used, poor point alignment may not occur, so that a display of the liquid crystal display apparatus is better.

The conducting component has a same color as color of the color filter layer on both sides of the repairing point. The conducting component in the present embodiment is filled in the repairing point to not only realize filtering through connection with the color filter layer, but also electrically connected to the Indium Tin Oxide layer, so that the Indium Tin Oxide layer realizes electrical connection at the repairing point and avoids forming abnormal potential after removal of foreign matter. Then, when the liquid crystal display apparatus including the color filter substrate is used, poor point alignment may not occur, so that a display of the liquid crystal display apparatus is better.

The conducting component includes a conducting color filter layer 150, the conducting color filter layer 150 is directly filled in the repairing point to be electrically connected to the Indium Tin Oxide layer on both sides of the repairing point, and the conducting color filter layer 150 has the same color as color of the color filter layer on both sides of the repairing point. This is an optional manner for realizing electrical connection with the Indium Tin Oxide layer and realizing filtering in the application. A conducting color filter layer is used to realize electrical connection with the Indium Tin Oxide layer and realize filtering, thereby saving a production processes and saving production time.

Specifically, a height of the conducting color filter layer 150 is greater than a height of the repairing point, and the height of the conducting color filter layer is greater than a height of the Indium Tin Oxide layer on both sides. Because the height of the conducting color filter layer is greater than the height of the repairing point, when the conducting color filter layer is filled in the repairing point, the conducting color filter layer is fully connected to the Indium Tin Oxide layer on both sides of the repairing point to ensure a better electrical connection between the conducting color filter layer and the Indium Tin Oxide layer. However, for those of ordinary skill, it should be noted that the conducting color filter layer and the repairing point are disposed at an identical height in the present embodiment, the conducting color filter layer and the Indium Tin Oxide layer on both sides of the repairing point are disposed at an identical height.

In the present embodiment, a problem of dark spot at the repairing point is solved through filling the conducting color filter layer in the repairing point.

In one or more embodiments, for those of ordinary skill in the art, the conducting component in the present embodiment can solve the above technical problem in other manners. For example, the conducting component includes an additional filter 160 and a transparent conducting adhesive 170. Namely, the conducting component in the present embodiment is made of the additional filter 160 and the transparent conducting adhesive 170 without using the conducting color filter layer. Specifically, in combination with FIG. 1 and FIG. 2, the additional filter 160 is filled in the repairing point, the additional filter 160 has the same color as color of the color filter layer on both sides of the repairing point, and further, the additional filter 160 is made of the same material as that of the color filter layer on both sides of the repairing point. Thus, the present embodiment not only realizes filtering through connection with the color filter layer, but also electrically communicates with the Indium Tin Oxide layer, so that the Indium Tin Oxide layer realizes electrical connection at the repairing point and avoids forming abnormal potential after removal of foreign matter. Then, when the liquid crystal display apparatus including the color filter substrate is used, poor point alignment may not occur, so that a display of the liquid crystal display apparatus is better. The transparent conducting adhesive 170 is disposed on a surface of the additional filter 160, and the transparent conducting adhesive 170 is used for electrically communicating with the Indium Tin Oxide layer. This is another specific manner for realizing electrical connection of the conducting component with the Indium Tin Oxide layer and realizing filtering in the present embodiment. The transparent conducting adhesive 170 is made of material similar to that of the Indium Tin Oxide layer, and has better connection strength and electrical conductivity with the Indium Tin Oxide layer on both sides of the repairing point. However, for those of ordinary skill, it should be noted that in realizing electrical connection with the Indium Tin Oxide layer in the present embodiment, the transparent conducting adhesive is directly filled in the repairing point, i.e., only the transparent conducting adhesive is filled in the repairing point. The transparent conducting adhesive is made of material similar to that of the Indium Tin Oxide layer, and has better connection strength and electrical conductivity with the Indium Tin Oxide layer on both sides of the repairing point.

Figure 13:
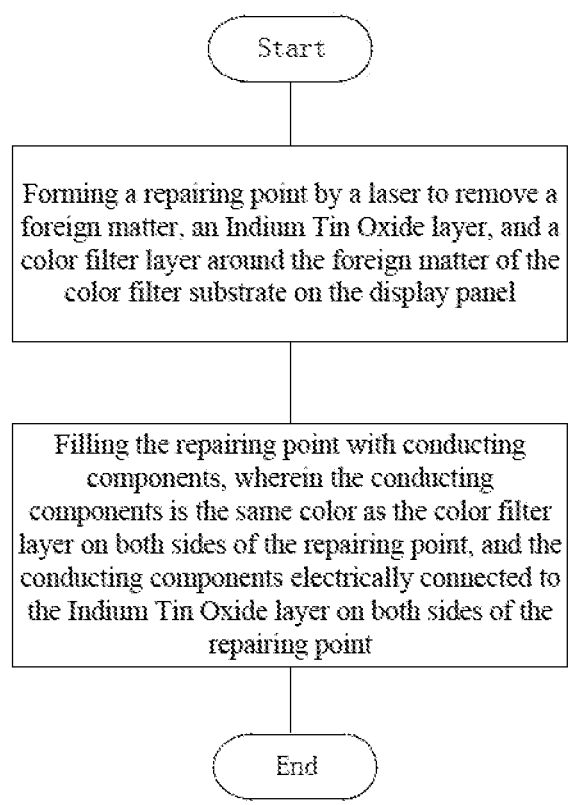
FIG. 13 is a flow chart of a repairing method for a display panel in an embodiment of the application.

In one or more embodiments, as shown in FIG. 13, the present embodiment discloses a repairing method for a display panel. The repairing method includes the following steps: step S101 and step S102.

Specifically:

Step S101: forming a repairing point by a laser to remove a foreign matter, a Indium Tin Oxide layer, and a color filter layer around the foreign matter of a color filter substrate on the display panel; and Step S102: filling the repairing point with the conducting components, the conducting components is the same color as the color filter layer on both sides of the repairing point, and the conducting components electrically connected to the Indium Tin Oxide layer on both sides of the repairing point.

In the step S101, referring to FIG. 1 and FIG. 2, the foreign matter 20 is removed by the laser 30. However, the Indium Tin Oxide layer and the color filter layer around the foreign matter are removed by the laser 30 to form a repairing point 15, when the foreign matter 20 is removed by the laser 30.

Thus, a problem in the step S101 is solved by the step S102.

In the step S102, referring to FIG. 4 to FIG. 12 and combining with FIG. 1 and FIG. 2, the conducting components having the same color as color of the color filter layer on both sides of the repairing point in the repairing point to be electrically connected to the Indium Tin Oxide layer on both sides of the repairing point. By filling the conducting components in the repairing point, the present embodiment not only realizes filtering through connection with the color filter layer, but also electrically communicates with the Indium Tin Oxide layer, so that the Indium Tin Oxide layer realizes electrical connection at the repairing point and avoids forming abnormal potential after removal of foreign matter. Then, when the liquid crystal display apparatus including the color filter substrate is used, poor point alignment may not occur, so that a display of the liquid crystal display apparatus is better.

The conducting component includes a conducting color filter layer 150, the conducting color filter layer 150 is directly filled in the repairing point to be electrically connected to the Indium Tin Oxide layer on both sides of the repairing point, and the conducting color filter layer 150 has the same color as color of the color filter layer on both sides of the repairing point. This is an optional manner for realizing electrical connection with the Indium Tin Oxide layer and realizing filtering in the application. A conducting color filter layer is used to realize electrical connection with the Indium Tin Oxide layer and realize filtering, thereby saving a production processes and saving production time.

Specifically, a height of the conducting color filter layer 150 is greater than a height of the repairing point, and the height of the conducting color filter layer is greater than a height of the Indium Tin Oxide layer on both sides of the repairing point. Because the height of the conducting color filter layer is greater than the height of the repairing point, when the conducting color filter layer is filled in the repairing point, the conducting color filter layer is fully in connection with the Indium Tin Oxide layer on both sides of the repairing point to ensure a better electrical connection between the conducting color filter layer and the Indium Tin Oxide layer. Of course, the conducting color filter layer and the repairing point are disposed at an identical height in the present embodiment, as shown in FIG. 5.

In one or more embodiments, the conducting color filter layer is made of color conducting rubber and other conducting materials, or made by doping the conducting materials, such as metal powder, graphite powder, etc. in the color filter layer. For those of ordinary skill in the art, it shall be noted that electrical connection with the Indium Tin Oxide layer and filtering can also be realized in other manners in the present embodiment. For example, the conducting component includes an additional filter 160 and a transparent conducting adhesive 170. Namely, the conducting component in the present embodiment is made of the additional filter 160 and the transparent conducting adhesive 170 without using the conducting color filter layer. Specifically, in combination with FIG. 1 and FIG. 2, the additional filter is filled in the repairing point, the additional filter has the same color as color of the color filter layer on both sides of the repairing point, and further, the additional filter is made of the same material as that of the color filter layer on both sides of the repairing point. The transparent conducting adhesive is disposed on a surface of the additional filter, and the transparent conducting adhesive is used for electrically communicating with the Indium Tin Oxide layer.

The above contents are further detailed descriptions of the application in combination with specific optional embodiments. However, the specific implementation of the application shall not be considered to be only limited to these descriptions. For those of ordinary skill in the art to which the application belongs, several simple deductions or replacements may be made without departing from the conception of the application, all of which shall be considered to belong to the protection scope of the application.

The invention claimed is:

1. A display panel, comprising a color filter substrate, wherein the color filter substrate comprising:
 a substrate;
 a color filter layer disposed on the substrate;
 an Indium Tin Oxide layer disposed on the color filter layer, wherein a repairing point is disposed on a same position of the color filter layer and the Indium Tin Oxide layer; and
 conducting components filled in the repairing point, electrically connected to the Indium Tin Oxide layer on both sides of the repairing point;
 wherein the conducting component comprises a conducting color filter layer, the conducting color filter layer directly filled in the repairing point to be electrically connected to the Indium Tin Oxide layer on both sides of the repairing point; the conducting color filter layer has a same color as a color of the color filter layer on both sides of the repairing point, and a height of the conducting color filter layer is greater than a height of the repairing point, and the height of the conducting color filter layer is greater than a height of the Indium Tin Oxide layer on both sides of the repairing point, wherein the conducting component comprises an additional filter and a transparent conducting adhesive, the additional filter is filled in the repairing point, and the additional filter has a same color as color of the color filter layer on both sides of the repairing point;
 wherein the transparent conducting adhesive is disposed on a surface of the additional filter, and the transparent conducting adhesive is configured to be electrically connected to the Indium Tin Oxide layer.

2. A display panel, comprising a color filter substrate, wherein the color filter substrate comprises:
 a substrate;
 a color filter layer disposed on the substrate
 an Indium Tin Oxide layer disposed on the color filter layer, wherein the repairing point is disposed on a same position of the color filter layer and the Indium Tin Oxide layer; and
 conducting components filled in the repairing point, electrically connected to the Indium Tin Oxide layer on both sides of the repairing point, wherein the conducting component comprises an additional filter and a transparent conducting adhesive, the additional filter is filled in the repairing point, and the additional filter has a same color as color of the color filter layer on both sides of the repairing point;
 wherein the transparent conducting adhesive is disposed on a surface of the additional filter, and the transparent conducting adhesive is configured to be electrically connected to the Indium Tin Oxide layer.

3. The display panel according to claim 2, wherein the conducting components has a same color as a color of the color filter layer on both sides of the repairing point.

4. The display panel according to claim 2, wherein the conducting component comprises a conducting color filter layer directly filled in the repairing point to be electrically connected to the Indium Tin Oxide layer on both sides of the repairing point, and the conducting color filter layer has a same color as color of the color filter layer on both sides of the repairing point.

5. The display panel according to claim 4, wherein a shading layer is also disposed on the substrate, and the shading layer is disposed between two adjacent color filter layers.

6. The display panel according to claim 4, wherein a height of the conducting color filter layer is greater than a height of the repairing point, and the height of the conducting color filter layer is greater than height of the Indium Tin Oxide layer on both sides of the repairing point.

7. The display panel according to claim 2, wherein the transparent conducting adhesive is equal to the thickness of the Indium Tin Oxide layer.

8. The display panel according to claim 2, wherein the conducting component comprises a transparent conducting adhesive filled in the repairing point to be electrically connected to the Indium Tin Oxide layer.

9. The display panel according to claim 8, wherein the transparent conducting adhesive and the Indium Tin Oxide layer on both sides of the repairing point are disposed at an identical height.

10. A repairing method of a display panel, wherein the repairing method comprises the following steps:
 forming a repairing point by a laser to remove a foreign matter, an Indium Tin Oxide (ITO) layer, and a color filter layer around the foreign matter of the color filter substrate on the display panel; and
 filling the repairing point with conducting components, wherein the conducting components is the same color as the color filter layer on both sides of the repairing point, and the conducting components electrically connected to the Indium Tin Oxide layer on both sides of the repairing point, wherein a conducting component comprises a conducting color filter layer directly filled in the repairing point to be electrically connected to the Indium Tin Oxide layer on both sides of the repairing point, and the conducting color filter layer has a same color as color of the color filter layer on both sides of the repairing point, wherein the conducting component comprises an additional filter and a transparent conducting adhesive, the additional filter is filled in the repairing point, and the additional filter has a same color as color of the color filter layer on both sides of the repairing point; the transparent conducting adhesive is disposed on a surface of the additional filter, and the transparent conducting adhesive is used to be electrically connected to the Indium Tin Oxide layer.

11. The repairing method of the display panel according to claim wherein a shading layer is also disposed on the substrate; and the shading layer is disposed between two adjacent color filter layers.

12. The repairing method of the display panel according to claim 10, wherein the conducting color filter layer and the Indium Tin Oxide layer on both sides of the repairing point are disposed at an identical height.

13. The repairing method of the display panel according to claim 10, wherein a height of the conducting color filter layer is greater than a height of the repairing point, and the height of the conducting color filter layer is greater than a height of the Indium Tin Oxide layer on both sides of the repairing point.

14. The repairing method of the display panel according to claim 10, wherein the additional filter and the color filter layer on both sides of the repairing point are disposed at an identical height.

15. The display panel according to claim 4, wherein the conducting color filter layer and the Indium Tin Oxide layer on both sides of the repairing point are disposed at an identical height.

16. The display panel according to claim 1, wherein he additional filter and the color filter layer on both sides of the repairing point are disposed at an identical height.

17. The repairing method of the display panel according to claim 10, wherein the conducting component comprises a transparent conducting adhesive filled in the repairing point to be electrically connected to the Indium Tin Oxide layer.

* * * * *